United States Patent
Xu

(10) Patent No.: US 12,153,695 B2
(45) Date of Patent: Nov. 26, 2024

(54) RESOURCE ENCRYPTION AND DISPLAY

(71) Applicant: Shanghai Bilibili Technology Co., Ltd., Shanghai (CN)

(72) Inventor: Xingwang Xu, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 276 days.

(21) Appl. No.: 17/844,825

(22) Filed: Jun. 21, 2022

(65) Prior Publication Data
US 2022/0321344 A1   Oct. 6, 2022

Related U.S. Application Data

(63) Continuation of application No. PCT/CN2020/140993, filed on Dec. 29, 2020.

(30) Foreign Application Priority Data

Jun. 5, 2020 (CN) .......................... 202010507936.9

(51) Int. Cl.
G06F 21/62 (2013.01)
H04L 9/32 (2006.01)

(52) U.S. Cl.
CPC .............. *G06F 21/62* (2013.01); *H04L 9/32* (2013.01)

(58) Field of Classification Search
CPC .... G06F 21/62; G06F 9/44505; G06F 21/602; G06F 21/6218; G06F 9/451; H04L 9/32; H04L 67/06; H04L 2463/121; H04L 63/0428; H04L 67/1095; H04L 67/1097; H04W 12/61
See application file for complete search history.

(56) References Cited

U.S. PATENT DOCUMENTS

| | | | |
|---|---|---|---|
| 8,261,320 B1* | 9/2012 | Serenyi | G06F 16/958 718/1 |
| 2002/0057795 A1 | 5/2002 | Spurgat et al. | |
| 2005/0022165 A1* | 1/2005 | Ruff | G06F 9/445 717/121 |

(Continued)

FOREIGN PATENT DOCUMENTS

| CN | 102025490 A | 4/2011 |
|---|---|---|
| CN | 106331763 A | 1/2017 |

(Continued)

OTHER PUBLICATIONS

International Search Report with a mailing date of Mar. 25, 2021, in International application No. PCT/CN2020/140993, filed on Dec. 29, 2020.

*Primary Examiner* — Henry Tsang
(74) *Attorney, Agent, or Firm* — McAndrews, Held & Malloy, Ltd.

(57) ABSTRACT

Disclosed is a method of resource encryption and display. The method includes: performing file splitting and local encryption on a pre-downloaded splash screen resource file; calculating a current true time according to a correct time obtained from a server and a device power-on time difference of a client, and determining whether a current device time is reliable according to the true time; and when the current device time is reliable, directly obtaining the splash screen resource file through decryption and splicing, and displaying the splash screen resource file.

18 Claims, 7 Drawing Sheets

(56) References Cited

U.S. PATENT DOCUMENTS

| | | |
|---|---|---|
| 2005/0135613 A1 | 6/2005 | Brandenburg |
| 2007/0124819 A1 | 5/2007 | Strohwig et al. |
| 2016/0117518 A1 | 4/2016 | Cao et al. |
| 2018/0365434 A1* | 12/2018 | Ke ........................ H04L 9/0894 |
| 2019/0340384 A1* | 11/2019 | Huang ............. H04N 21/85406 |
| 2020/0029124 A1 | 1/2020 | Bacon |

FOREIGN PATENT DOCUMENTS

| | | | |
|---|---|---|---|
| CN | 10715379 A | 9/2017 | |
| CN | 107341368 A | 11/2017 | |
| CN | 108038075 A | 5/2018 | |
| CN | 108923875 A * | 11/2018 | ............ H04J 3/0635 |
| CN | 109428912 A | 3/2019 | |
| CN | 109995735 A | 7/2019 | |
| CN | 110138716 A | 8/2019 | |
| CN | 110381061 A | 10/2019 | |
| CN | 110838885 A | 2/2020 | |
| CN | 111212065 A | 5/2020 | |
| JP | 2007241907 A | 9/2007 | |

\* cited by examiner

RESOURCE ENCRYPTION AND DISPLAY

CROSS-REFERENCE TO RELATED APPLICATION

The present application is continuation under 35 U.S.C. 111(a) of PCT International Application No. PCT/CN2020/140993, filed on Dec. 29, 2020, which claims priority to Chinese Patent Application No. 202010507936.9, filed with the China National Intellectual Property Administration on Jun. 5, 2020, which is incorporated herein by reference in its entirety.

TECHNICAL FIELD

The present application relates to the technical field of data processing, and in particular to a method of resource encryption and display, an electronic apparatus, and a computer-readable storage medium.

BACKGROUND

Splash screen is a transition page presented to users each time an application is started, usually with the intention of concealing the fact that the startup speed is slow. At present, as the splash screen page can provide the largest display area and the richest display content, it exists as the first advertising space in all major applications.

It should be noted that the foregoing content is not intended to limit the protection scope of the present application.

SUMMARY

An aspect of the embodiments of the present application provides a method including:
  performing file splitting and local encryption on a pre-downloaded resource file, where the local encryption is encrypting of at least one component part of the resource file;
  calculating a current true time according to a correct time obtained from a server and a device power-on time difference of a client, and determining whether a current device time is reliable according to the true time; and
  in response to determining that the current device time is reliable, obtaining the resource file through decryption and splicing, and displaying the resource file.

In some embodiments, the performing file splitting and local encryption on a pre-downloaded resource file includes:
  transferring the resource file and changing a file format to obtain a hidden file;
  encrypting a hidden path corresponding to the hidden file;
  splitting the hidden file into a plurality of component parts; and
  removing at least one component part from the hidden file, and encrypting the removed component part.

In some embodiments, the performing file splitting and local encryption on a pre-downloaded resource file includes:
  transferring the resource file and changing a file format to obtain a hidden file;
  recording a hidden path corresponding to the hidden file to an encrypted resource management file;
  splitting the hidden file into header information and a remaining part; and
  removing the header information from the hidden file, and writing the header information into a corresponding field of the resource management file.

In some embodiments, the calculating a current true time according to a correct time obtained from a server and a device power-on time difference of a client, and determining whether a current device time is reliable according to the true time includes:
  determining whether the device has been restarted since the correct time was last obtained from the server;
  in response to determining that the device has not been restarted, calculating the current true time according to the correct time last obtained from the server and the device power-on time difference, where the device power-on time difference is a difference between a first power-on time of the device when the correct time was last obtained from the server and a second power-on time of the device that is obtained currently;
  comparing whether a current system time is equal to the true time; and
  determining that the current device time is reliable in response to determining that the system time is equal to the true time.

In some embodiments, the calculating a current true time according to a correct time obtained from a server and a device power-on time difference of a client, and determining whether a current device time is reliable according to the true time further includes:
  determining that the current device time is unreliable in response to determining that the device has been restarted since the correct time was last obtained from the server or in response to determining that the system time is not equal to the true time.

In some embodiments, the true time is the correct time plus the device power-on time difference.

In some embodiments, the obtaining the resource file through decryption and splicing, and displaying the resource file includes:
  decrypting the hidden path and the removed component part of the hidden file;
  obtaining a remaining component part of the hidden file according to the hidden path; and
  splicing the removed component part and the remaining component part to obtain and display the complete resource file.

In some embodiments, the obtaining the resource file through decryption and splicing, and displaying the resource file includes:
  decrypting the resource management file to obtain the hidden path and the header information;
  obtaining the remaining part of the hidden file according to the hidden path; and
  splicing the header information and the remaining part to obtain and display the complete resource file.

In some embodiments, the method further includes:
  randomly recording a timeline in a running process of an application corresponding to the resource file, and in response to determining that the timeline is found not conform to the normal time rule, setting the current device time to be unreliable.

In some embodiments, the resource is a splash screen resource.

An aspect of the embodiments of the present application further provides an electronic apparatus, including: one or more processors; and a memory storing one or more programs configured to be executed by the one or more processors, the one or more programs comprising instructions for:

performing file splitting and local encryption on a pre-downloaded resource file, where the local encryption is encrypting of at least one component part of the resource file;

calculating a current true time according to a correct time obtained from a server and a device power-on time difference of a client, and determining whether a current device time is reliable according to the true time; and in response to determining that the current device time is reliable, obtaining the resource file through decryption and splicing, and displaying the resource file.

An aspect of the embodiments of the present application further provides a non-transitory computer-readable storage medium storing one or more programs comprising instructions that, when executed by one or more processors of a computing device, cause the computing device to perform operations comprising:

performing file splitting and local encryption on a pre-downloaded resource file, where the local encryption is encrypting of at least one component part of the resource file;

calculating a current true time according to a correct time obtained from a server and a device power-on time difference of a client, and determining whether a current device time is reliable according to the true time; and in response to determining that the current device time is reliable, obtaining the resource file through decryption and splicing, and displaying the resource file.

DETAILED DESCRIPTION OF EMBODIMENTS

To make the embodiments and advantages of the present application clearer and more comprehensible, the present application will be further described in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

It should be noted that the descriptions related to "first", "second", and the like in the embodiments of the present application are merely used for the illustrative purpose, and should not be construed as indicating or implying the relative importance thereof or implicitly indicating the number of technical features indicated. Thus, features defined with "first" and "second" may explicitly or implicitly include at least one of the features. In addition, technical solutions of various embodiments can be combined with each other, but they must be based on the implementation by those of ordinary skill in the art. When a combination of technical solutions is contradictory or cannot be implemented, it should be considered that such a combination of the technical solutions neither exists, nor falls within the protection scope claimed by the present application.

Because the splash screen page is the first startup screen, the network may not be available yet when a splash screen resource is displayed. Moreover, the richness of the resource also means increase of volume. Therefore, the splash screen resource is usually downloaded and stored in advance, and then displayed when necessary. However, if the resource is to be encrypted, many problems occur, making it impossible to display the resource quickly and safely.

At present, a main implementation is to deliver a splash screen resource, or display directly an online resource on the day when it is to be displayed. However, the inventor realized that the first implementation loses the real-time performance and the success rate of display. The users may no longer open the splash screen page the day the resource is downloaded. Although the second implementation can avoid the above problems, it has defects in the fluency of resource display. In severe cases, resource loading may block the use of applications due to network problems. In addition, both implementations involve communication with a server, which takes 100 milliseconds or longer. In some blocked scenarios, a client can decide what to do next only after the communication has been completed, which brings user experience problems. If the splash screen resource loading takes too long, it will lead to a delay in entering the applications.

Figure 1:
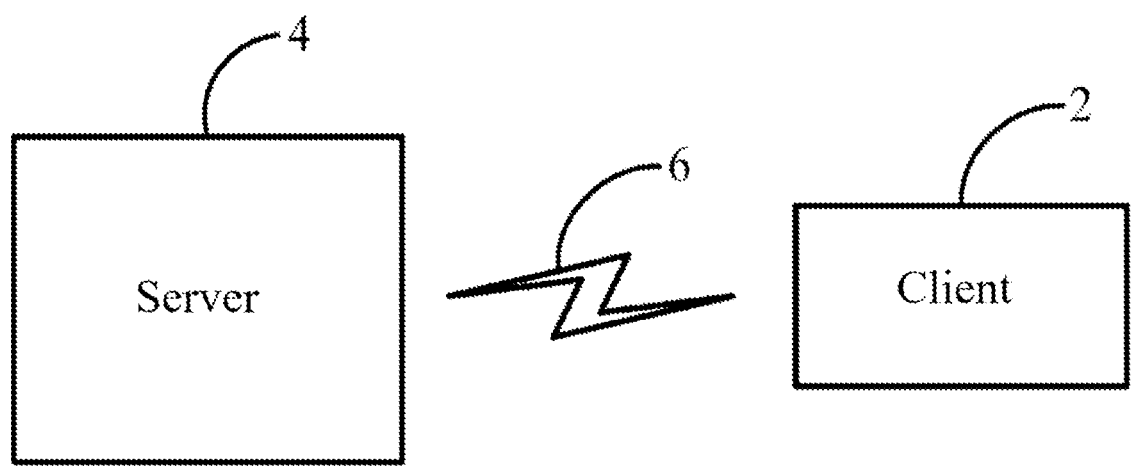
FIG. 1 is an architecture diagram of an application environment for implementing various embodiments of the present application.

Referring to FIG. 1, FIG. 1 is an architecture diagram of an application environment for implementing various embodiments of the present application. The present application may be applied to an application environment including, but not limited to, a client 2, a server 4, and a network 6.

The client 2 is configured to download a resource file from the server 4 and perform splitting, encryption, decryption, and display. The client 2 may be a terminal device, e.g., a mobile phone, a tablet computer, a personal computer (PC), a portable computer, or a wearable device.

The server 4 is configured to provide the client 2 with the resource file and a correct time. The server 4 may be a computing device, e.g., a rack server, a blade server, a tower server, or a cabinet server, or may be a standalone server or a server cluster composed of a plurality of servers.

The network 6 may be a wireless or wired network, e.g., an intranet, the Internet, a global system for mobile communications (GSM), wideband code division multiple access (WCDMA), a 4G network, a 5G network, a Bluetooth network, or a Wi-Fi network. The server 4 and one or more clients 2 are communicatively connected over the network 6 for data transmission and exchange.

It should be noted that, in the following embodiments, the resource encryption and display solutions of the present application will be described by taking a splash screen resource as an example. However, it should be understood that other resources that have similar characteristics to the splash screen resource, such as any resource that can be downloaded by means of preloading, can be encrypted and displayed using a solution similar to the present application.

Figure 2:
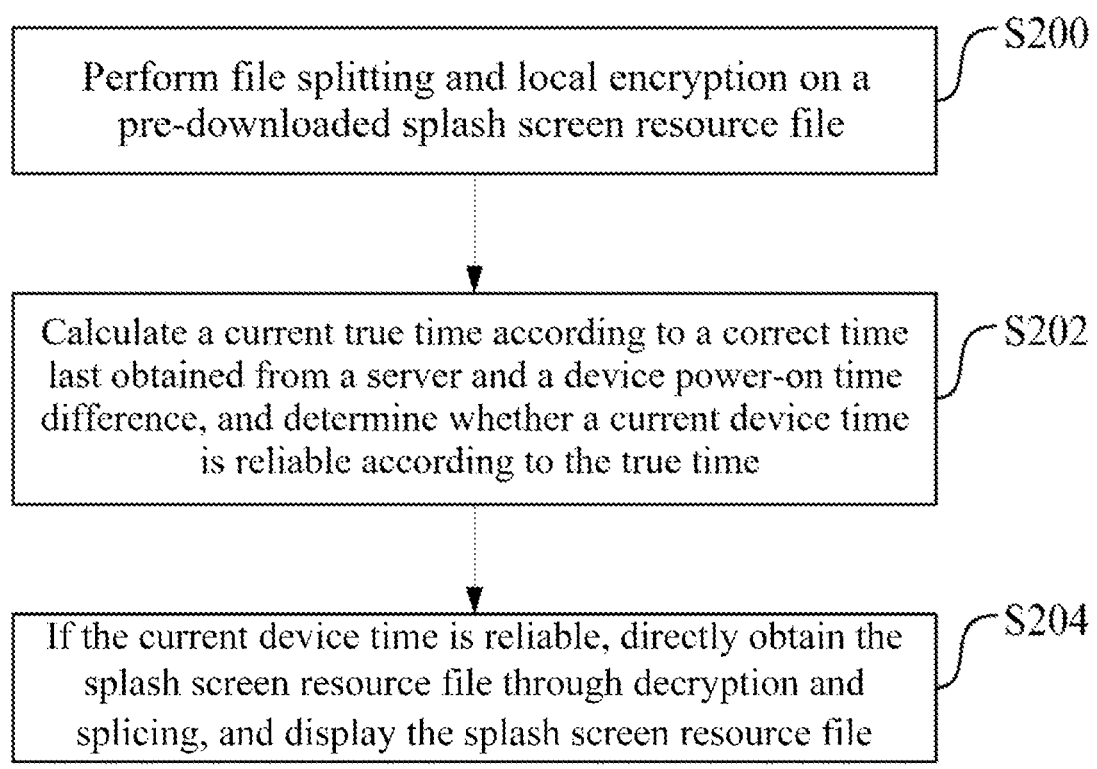
FIG. 2 is a flowchart of a method of resource encryption and display according to some embodiments of the present application.

FIG. 2 is a flowchart of a method of resource encryption and display according to some embodiments of the present application. It may be understood that the flowchart in this method embodiment is not intended to limit an execution sequence of the steps. In this embodiment, the client 2 is used as a main execution body for exemplary description.

The method includes the following steps.

S200: Perform file splitting and local encryption on a pre-downloaded splash screen resource file.

The splash screen resource file is used to provide loaded content to a splash screen page of an application and is pre-downloaded by the client 2 from the server 4. In this embodiment, after the client 2 downloads the splash screen resource file, file splitting and local encryption may be first performed on the splash screen resource file, specifically including operations such as resource hiding (transferring the downloaded splash screen resource file and changing a format), path encryption (recording a hidden path into an encrypted resource management file), file splitting (removing header information), and partial encryption (writing the header information into a corresponding field of the resource management file). The local encryption refers to encrypting at least one component part of the splash screen resource file after the splitting.

Figure 3:
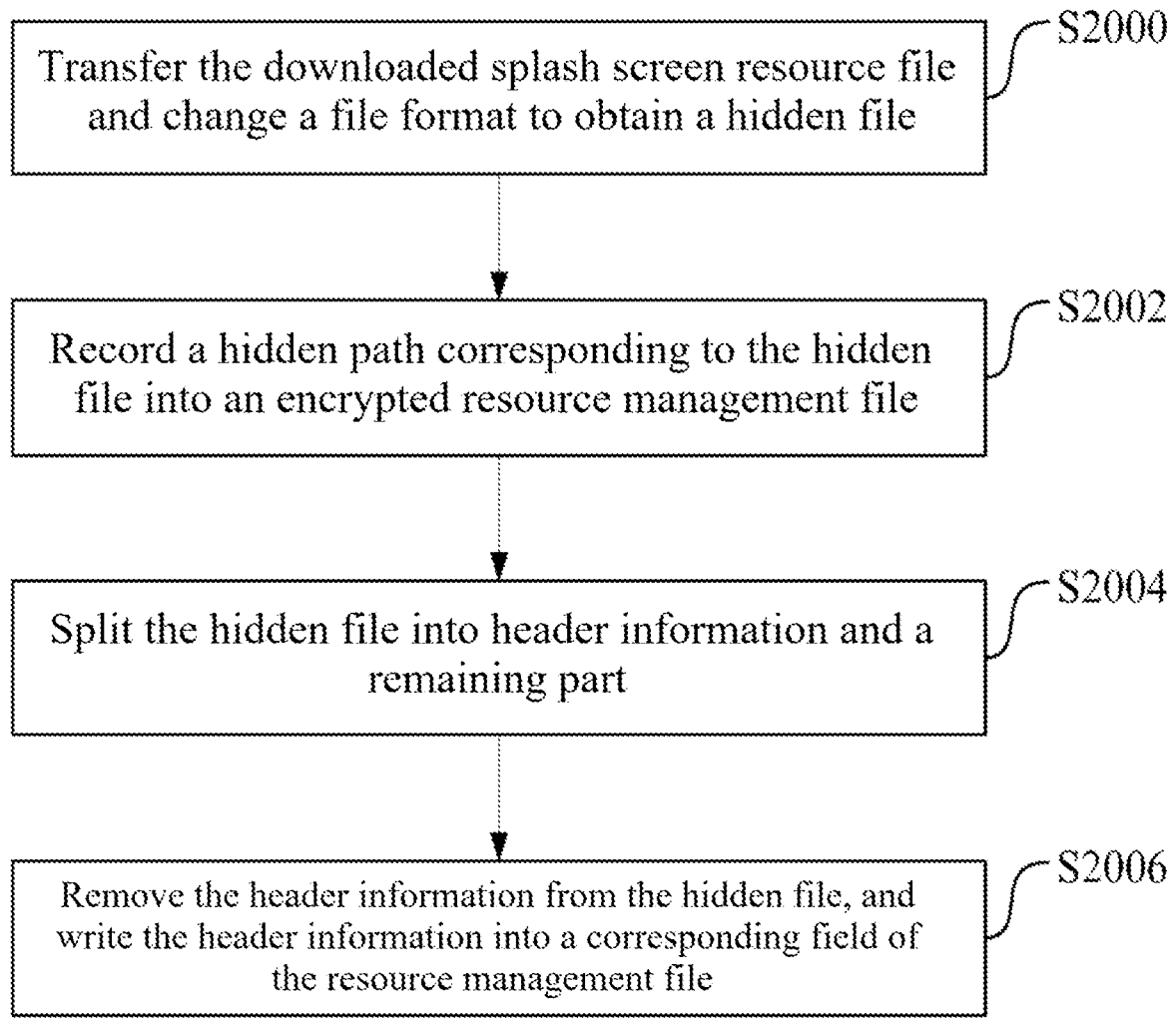
FIG. 3 is a detailed schematic flowchart of step S200 in FIG. 2.

For details, refer to FIG. 3, which is a detailed schematic flowchart of step S200. It may be understood that the flowchart is not intended to limit an execution sequence of the steps. As required, addition or deletion may also be made to some steps in the flowchart. In this embodiment, step S200 specifically includes the following steps.

S2000: Transfer the downloaded splash screen resource file and change a file format to obtain a hidden file.

When the splash screen resource file corresponding to an application is downloaded from the server 4, the downloaded splash screen resource file is transferred to a specific location for storage, for example, in a random directory of the application that is not subject to automatic cleanup. Then, a suffix to a filename of the splash screen resource file is removed, and the filename is changed to a name with a naming style similar to file names in the directory. For example, file names in most directories are in the base64 format. The splash screen resource file obtained after the transfer and change is the hidden file.

S2002: Record a hidden path corresponding to the hidden file into an encrypted resource management file.

The hidden path is a path for a storage location of the transferred splash screen resource file, i.e., a storage path of the hidden file. After the hidden file is obtained, the hidden path is recorded into a resource management file, which is an encrypted file.

S2004: Split the hidden file into header information and a remaining part.

The hidden file is split according to a preset splitting policy. The splitting policy includes how many parts the hidden file is to be split into, and where to split. In this embodiment, the hidden file is split into two parts: header information and a remaining part. The header information is information of fixed byte length, and the byte length or information content may be pre-configured. The remaining part is content left after the header information is removed from the hidden file.

S2006: Remove the header information from the hidden file, and writing the header information into a corresponding field of the resource management file.

After the hidden file is split, the header information in the hidden file is removed and only the remaining part is kept, and the removed header information is written into the corresponding field of the resource management file. As the resource management file is an encrypted file, the header information is encrypted, i.e., the hidden file (the splash screen resource file) is locally encrypted.

It should be noted that the embodiments of the present application focus on file splitting and local encryption, so as to make the splash screen resource file unrecognizable. The specific number of parts into which the file is split and the specific method of encryption do not affect the encryption effect, and how to split and encrypt the file may depend on an actual scenario and file type. To be specific, in other embodiments, step S200 may alternatively include: transferring the downloaded splash screen resource file and changing a file format to obtain a hidden file; encrypting a hidden path corresponding to the hidden file; splitting the hidden file into a plurality of component parts; and removing at least one component part from the hidden file, and encrypting the removed component part.

For example, it is assumed that the splash screen resource file is a zip file, the file header information (information about start bytes of the file) occupies 512 bytes, representing information such as file type and modification time. After the splash screen resource file is transferred and changed to obtain a corresponding hidden file and hidden path, the 512-byte information is used as the header information during file splitting, and the header information is removed from the hidden file. Certainly, the removed component part may alternatively be set to 1024-byte information (the file header information plus partial content information, or simply partial content information), or to even more bytes. The header information (or another removed component part) is written into a Content field of the encrypted resource management file, and the hidden path is written into a File field of the resource management file. When the splash screen resource is be displayed later, the header information (or another removed component part) corresponding to the part of data in the Content field and the remaining part corresponding to the hidden path in the File field are combined together, and the splash screen resource file can be complete again through splicing. The encryption method may be simple AES (Advanced Encryption Standard) encryption, or a stronger encryption algorithm such as 3DES (Triple Data Encryption Algorithm) encryption.

When the header information and the suffix are lacking and the file path (the hidden path) is not fixed, the splash screen resource file cannot be opened, thus ensuring the security of the splash screen resource. In addition, the embodiment uses local encryption instead of encrypting the entire file, thereby greatly reducing consumption of resources required for encryption. Besides, file splitting and encryption can be implemented with or without a network connection by using the foregoing method.

Referring back to FIG. 2, S202 includes calculating a current true time according to a correct time last obtained from the server 4 and a device power-on time difference, and determining whether a current device time is reliable according to the true time.

When the application is started and the splash screen resource is to be displayed, in order to determine the authenticity of the current device time, the client 2 may compare the current device time with the correct time obtained from the server 4. However, in order to save the time consumption in communicating with the server 4 when starting the application, in this embodiment, it can be determined whether the current device time is reliable according to the correct time last obtained from the server 4 and the device power-on time difference without a network connection.

The processing method used in this embodiment is based on the usage habit of current users: leaving the device on or started for a long time. When the device has not been restarted since synchronizing with the server 4 for a correct time, the current true time can be directly calculated and the splash screen resource can be displayed in this embodiment. When the client 2 has been restarted since then, it is necessary to perform determination and calculate the time again when starting.

Figure 4:
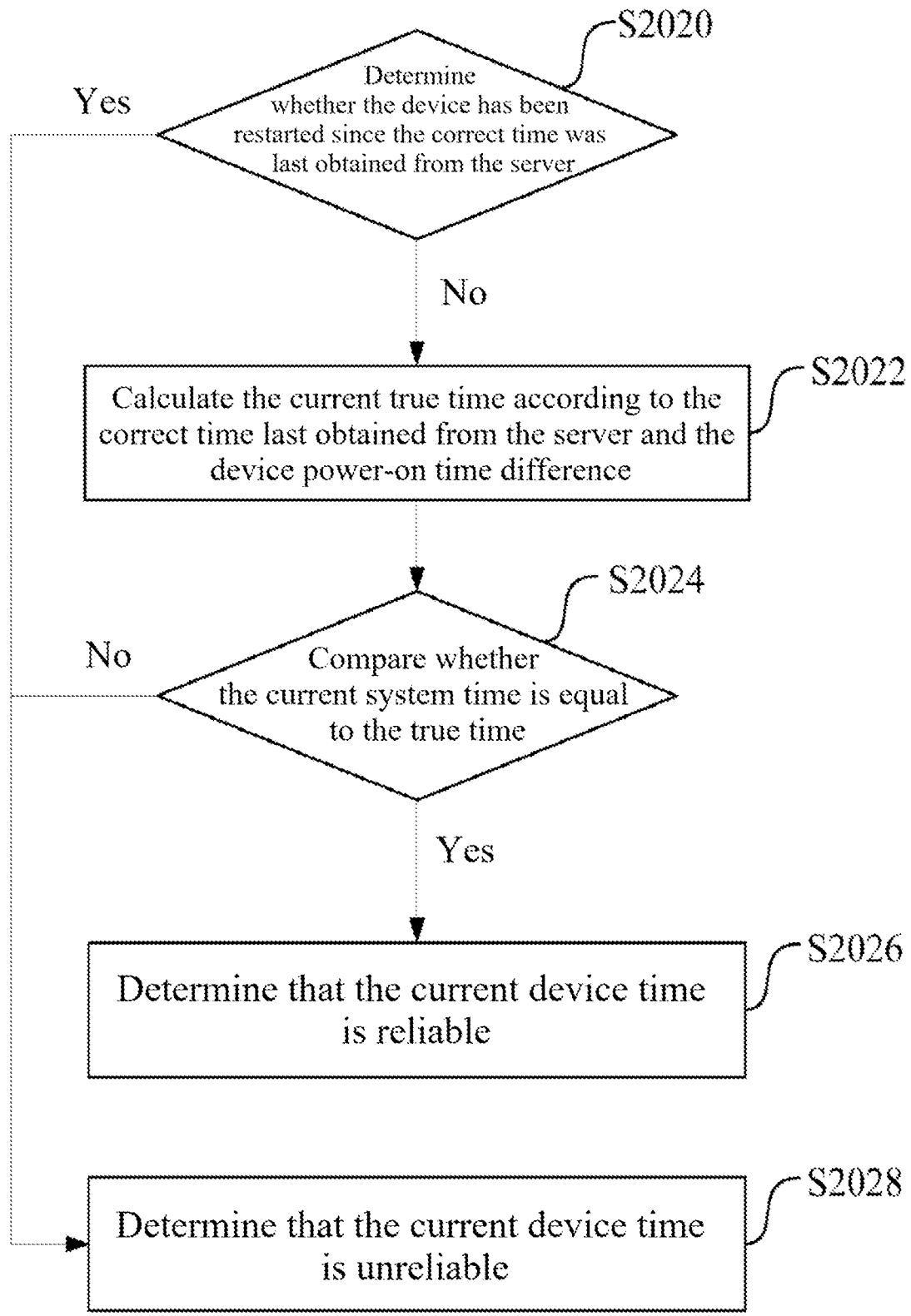
FIG. 4 is a detailed schematic flowchart of step S202 in FIG. 2.

For details, refer to FIG. 4, which is a detailed schematic flowchart of S202. It may be understood that the flowchart is not intended to limit an execution sequence of the steps. As required, addition or deletion may also be made to some steps in the flowchart. In this embodiment, step S202 specifically includes the following steps.

S2020: Determine whether the device has been restarted since the correct time was last obtained from the server 4. If not restarted, step S2022 is to be performed, and if restarted, step S2028 is to be performed.

The client 2 may synchronize with the server 4 for a correct time serverTime (a server time at synchronization) by communicating with the server 4. According to some embodiments, the correct time may be updated by directly requesting time synchronization with the server 4 or by a time stamp returned in another request to the server 4. Moreover, the client 2 may directly obtain a current system time systemTime and a device power-on time poweronTime via a system interface. If the obtained device power-on time is very short (lower than a preset value) or shorter than a previously recorded device power-on time, it indicates that the device power-on time has been reset, i.e., the client 2 has been restarted.

Then, according to the system time and the device power-on time, a restart time point of the client 2 can be obtained, and it is further determined whether the time point is before or after the correct time was last obtained from the server 4, so as to determine whether the client 2 has been restarted since the correct time was last obtained from the server 4.

S2022: Calculate the current true time according to the correct time last obtained from the server 4 and the device power-on time difference.

The device power-on time difference is a difference between a first power-on time poweronTime1 of the device when the correct time was last obtained from the server 4 and a currently obtained second power-on time poweronTime2 of the device. When the client 2 has not been restarted since the correct time was last obtained from the server 4, the current true time trueTime can be calculated according to the correct time and the device power-on time difference. The formula for calculating the true time is:

trueTime=serverTime+(poweronTime 2−poweronTime 1)

S2024: Compare whether the current system time is equal to the true time. If they are equal, step S2026 is to be performed; and if they are not equal, step S2028 is to be performed.

The client 2 may obtain the current system time systemTime via the system interface, and then compare whether the system time is equal to the calculated true time.

S2026: Determine that the current device time is reliable.

Conditions for the client 2 to determine that the current device time is reliable are: the device has not been restarted since the correct time was last obtained from the server 4, and systemTime=trueTime. If the above conditions are met, the client 2 determines that the current device time is reliable.

S2028: Determine that the current device time is unreliable.

If the calculated true time is not equal to the system time, or the device has been restarted since the correct time was last obtained from the server 4 (i.e., the device has not obtained a correct time from the server 4 since the restart), the client 2 determines that the current device time is unreliable, and it is necessary to obtain a correct time from the server 4 again.

In this embodiment, the authenticity of the current device time can be ensured even without a network connection, thus saving time consumed for communicating with the server 4 when the application is started, and making a decision in a very short time (e.g., in 1 millisecond) to preferentially display the splash screen resource to a trusted device.

If it is determined that the current device time is unreliable, a time synchronization operation is triggered, and the correct time is forcibly re-obtained from the server 4 and updated. Later, when the device is not restarted, the above steps may be used to determine whether the current device time is reliable.

According to some embodiments, the client 2 further randomly records a timeline (including, but not limited to, the correct time, the power-on time of the device, and the system time) in a running process of an application, and when the timeline is found not conform to the normal time rule, sets the current device time to be unreliable, and then re-obtains a correct time from the server 4 for update. For example, the recorded system time is 8 o'clock, 9 o'clock, and 10 o'clock. If the next obtained system time is 6 o'clock, it indicates that the time has been changed, and the current device time is set to be unreliable.

Referring back to FIG. 2, S204 includes, if the current device time is reliable, directly obtaining the splash screen resource file through decryption and splicing, and displaying the splash screen resource file.

When the client 2 determines that the current device time is reliable, the splash screen resource file can be directly obtained and displayed without waiting for communication with the server 4.

Figure 5:
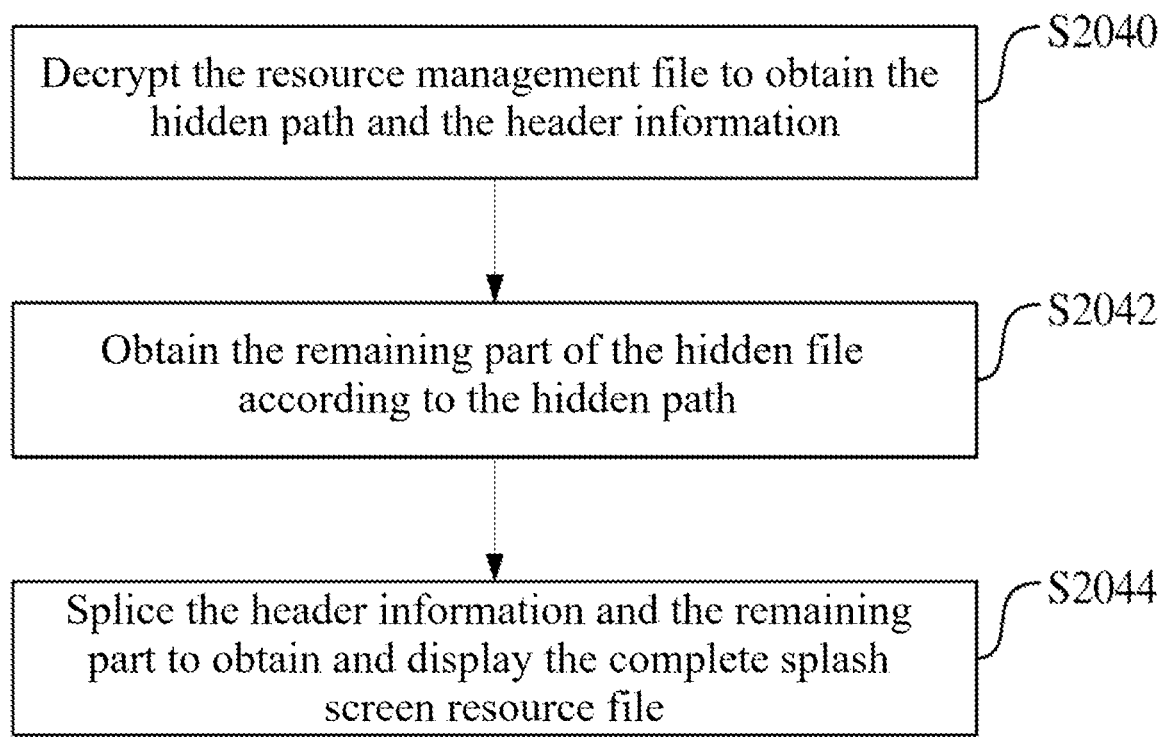
FIG. 5 is a detailed schematic flowchart of step S204 in FIG. 2.

For details, refer to FIG. 5, which is a detailed schematic flowchart of S204. It may be understood that the flowchart is not intended to limit an execution sequence of the steps. As required, addition or deletion may also be made to some steps in the flowchart. In this embodiment, step S204 specifically includes the following steps.

S2040: Decrypt the resource management file to obtain the hidden path and the header information.

As the hidden path and the header information corresponding to the splash screen resource file have previously been written into the encrypted resource management file, the hidden path and the header information can be obtained by decrypting the resource management file.

For example, after the resource management file is decrypted using a decryption method corresponding to the encryption method of the resource management file, the header information can be obtained from the Content field, and the hidden path can be obtained from the File field. When the splash screen resource is to be displayed later, the header information corresponding to the part of data in the Content field and the remaining part corresponding to the hidden path in the File field are combined together, and the splash screen resource file can be complete again through splicing.

S2042: Obtain the remaining part of the hidden file according to the hidden path.

The hidden path indicates a storage location of the remaining part of the hidden file after the header information is removed, and according to the hidden path, the client 2 can find the storage location and obtain the remaining part. For example, according to the hidden path obtained from the File field, the remaining part of the hidden file after the 512-byte header information is removed can be obtained.

S2044: Splice the header information and the remaining part to obtain and display the complete splash screen resource file.

As the splash screen resource file has been previously split into the header information and the remaining part, after the header information and the remaining part are obtained, the complete splash screen resource file can be obtained by splicing the two. Then, the corresponding splash screen resource is displayed to the user on a splash screen page of the currently started application according to the splash screen resource file.

Likewise, as there may be no limitation on the specific number of parts into which the file is split and the specific method of encryption, in other embodiments, step S204 may alternatively include: decrypting the hidden path and the removed component part of the hidden file; obtaining a remaining component part of the hidden file according to the hidden path; and splicing the removed component part and the remaining component part to obtain and display the complete splash screen resource file.

The method of resource encryption and display provided by this embodiment can ensure no leakage of the splash screen resource without a large amount of encryption and decryption computing resources; ensure the authenticity of the current device time to the greatest extent without depending on a network, and make a decision on whether to display the splash screen resource to the user without waiting for reconfirmation of time from the server, thus ensuring that most normal users can view the display of the splash screen resource at the first time.

Figure 6:
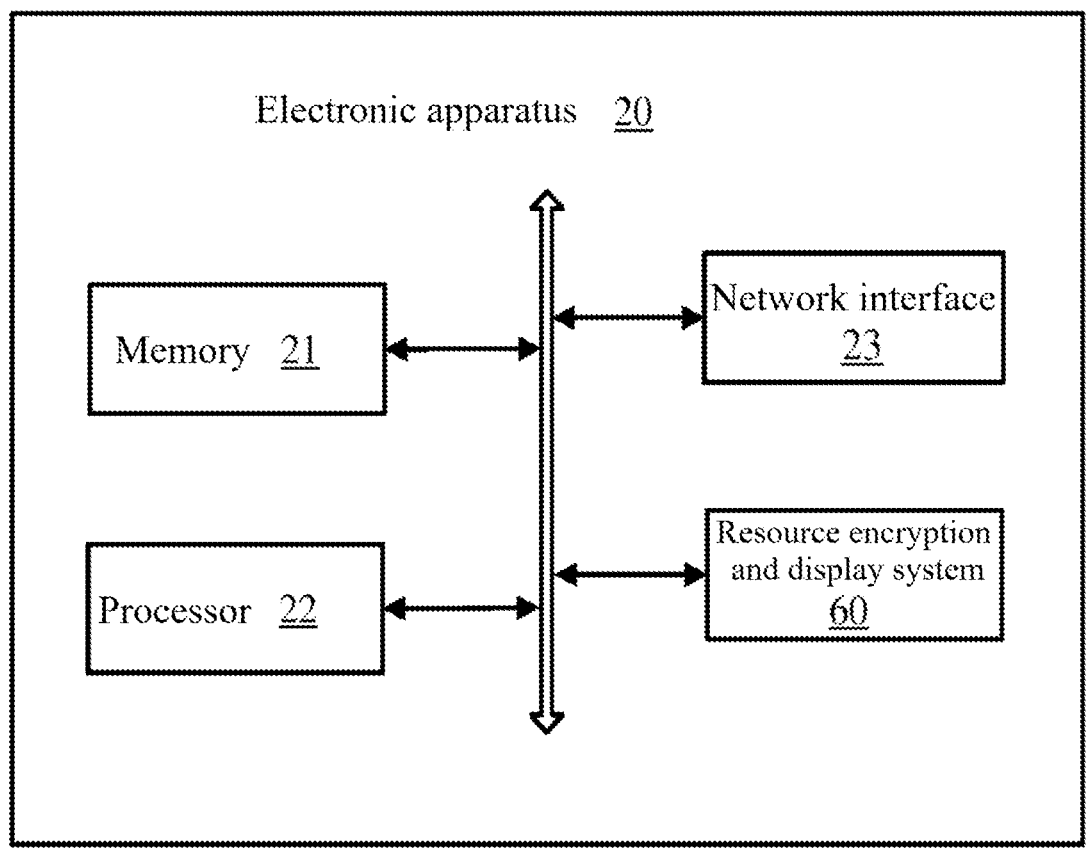
FIG. 6 is a schematic diagram of a hardware architecture of an electronic apparatus according to some embodiments of the present application.

FIG. 6 is a schematic diagram of a hardware architecture of an electronic apparatus 20 according to some embodiments of the present application. In this embodiment, the electronic apparatus 20 may include, but is not limited to, a memory 21, a processor 22, and a network interface 23 that can be communicatively connected to each other via a system bus. It should be noted that FIG. 6 shows only the electronic apparatus 20 having the components 21 to 23, but it should be understood that not all of the illustrated components are required to be implemented, and more or fewer components may be implemented instead. In this embodiment, the electronic apparatus 20 may be the client 2.

The memory 21 includes at least one type of readable storage medium, and the readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 21 may be an internal storage unit of the electronic apparatus 20, such as a hard disk or an internal memory of the electronic apparatus 20. In some other embodiments, the memory 21 may alternatively be an external storage device of the electronic apparatus 20, for example, a plug-in type hard disk equipped on the electronic apparatus 20, a smart media card (SMC), a secure digital (SD) card, or a flash card. Certainly, the memory 21 may alternatively include both the internal storage unit of the electronic apparatus 20 and the external storage device thereof. In this embodiment, the memory 21 is generally configured to store an operating system and various types of application software installed on the electronic apparatus 20, such as program code of a system of resource encryption and display 60. According to some embodiments, the memory 21 may be further configured to temporarily store various types of data that has been output or will be output.

The processor 22 may be, in some embodiments, a central processing unit (CPU), a controller, a microcontroller, a microprocessor, or other data processing chips. The processor 22 is generally configured to control overall operations of the electronic apparatus 20. In this embodiment, the processor 22 is configured to run the program code stored in the memory 21 or process data, for example, to run the system of resource encryption and display 60.

The network interface 23 may include a wireless network interface or a wired network interface, and the network interface 23 is typically configured to establish a communication connection between the electronic apparatus 20 and another electronic device.

Figure 7:
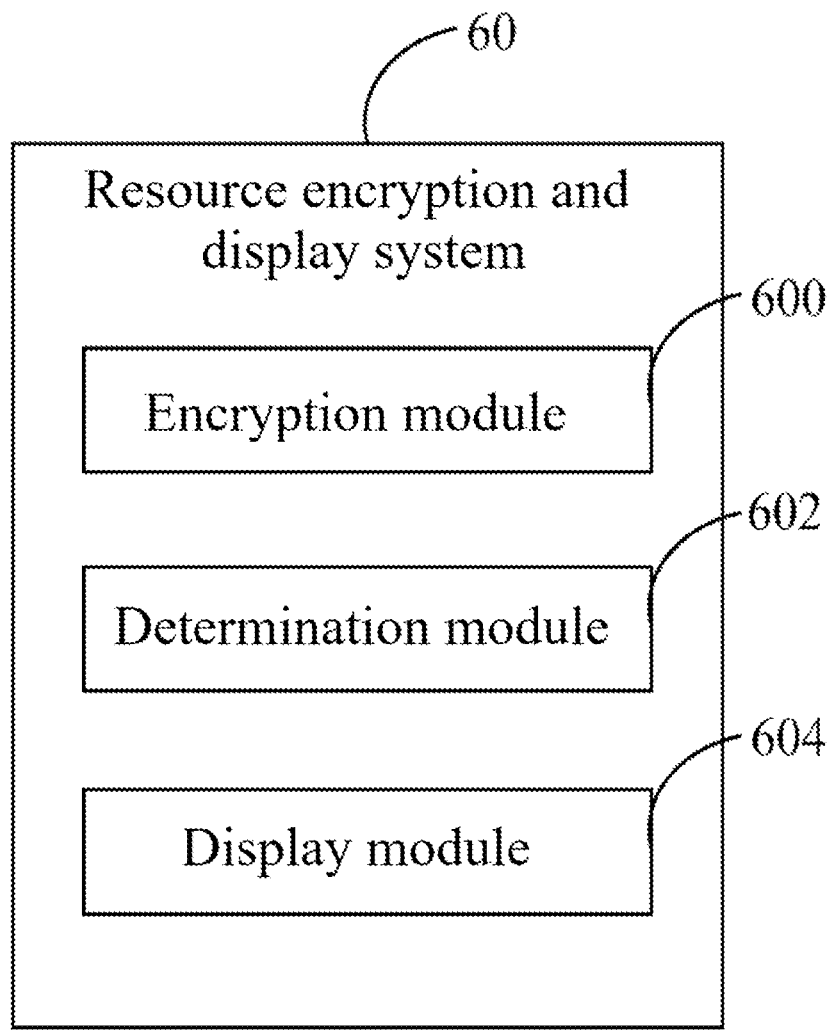
FIG. 7 is a schematic modular diagram of a system of resource encryption and display according to some embodiments of the present application.

FIG. 7 is a schematic modular diagram of a system of resource encryption and display 60 according to some embodiments of the present application. The system of resource encryption and display 60 may be divided into one or more program modules, and the one or more program modules are stored in a storage medium and executed by one or more processors to implement the embodiments of the present application. The program modules mentioned in this embodiment of the present application refer to a series of computer-readable instruction segments that can complete specific functions. Functions of various program modules in this embodiment will be specifically described below.

In this embodiment, the system of resource encryption and display 60 includes an encryption module 600, a determination module 602, and a display module 604.

The encryption module 600 is configured to perform file splitting and local encryption on a pre-downloaded splash screen resource file.

The splash screen resource file is used to provide loaded content to a splash screen page of an application and is pre-downloaded by the client 2 from the server 4. In this embodiment, after the client 2 downloads the splash screen resource file, file splitting and local encryption may be first performed on the splash screen resource file, specifically including operations such as resource hiding (transferring the downloaded splash screen resource file and changing a format), path encryption (recording a hidden path into an encrypted resource management file), file splitting (removing header information), and partial encryption (writing the header information into a corresponding field of the resource management file). The local encryption refers to encrypting at least one component part of the splash screen resource file after the splitting.

A specific process of performing file splitting and local encryption on the splash screen resource file by the encryption module 600 includes:

(1) transferring the downloaded splash screen resource file and changing a file format to obtain a hidden file;
(2) transferring the downloaded splash screen resource file and changing a file format to obtain a hidden file;
(3) splitting the hidden file into header information and a remaining part; and
(4) removing the header information from the hidden file, and writing the header information into a corresponding field of the resource management file.

Refer to FIG. 3 and its related description for specific details of the above process, which will not be repeated herein.

It should be noted that the embodiments of the present application focus on file splitting and local encryption, so as to make the splash screen resource file unrecognizable. The specific number of parts into which the file is split and the specific method of encryption do not affect the encryption effect, and how to split and encrypt the file may depend on an actual scenario and file type. To be specific, in other embodiments, the above process may alternatively include: transferring the downloaded splash screen resource file and changing a file format to obtain a hidden file; encrypting a hidden path corresponding to the hidden file; splitting the hidden file into a plurality of component parts; and removing at least one component part from the hidden file, and encrypting the removed component part.

When the header information and the suffix are lacking and the file path (the hidden path) is not fixed, the splash screen resource file cannot be opened, thus ensuring the security of the splash screen resource. In addition, the embodiment uses local encryption instead of encrypting the entire file, thereby greatly reducing consumption of resources required for encryption. Besides, file splitting and encryption can be implemented with or without a network connection by using the foregoing method.

The determination module 602 is configured to calculate a current true time according to a correct time last obtained from a server and a device power-on time difference, and determine whether a current device time is reliable according to the true time.

When the application is started and the splash screen resource is to be displayed, in order to determine the authenticity of the current device time, the client 2 may compare the current device time with the correct time obtained from the server 4. However, in order to save the time consumption in communicating with the server 4 when starting the application, in this embodiment, it can be determined whether the current device time is reliable according to the correct time last obtained from the server 4 and the device power-on time difference without a network connection. A specific process includes:
(1) determining whether the device has been restarted since the correct time was last obtained from the server 4;
(2) if the device has not been restarted, calculating the current true time according to the correct time last obtained from the server 4 and the device power-on time difference;
(3) comparing whether a current system time is equal to the true time;
(4) if they are equal, determining that the current device time is reliable; and
(5) determining that the current device time is unreliable when the device has been restarted since the correct time was last obtained from the server 4 or when the system time is not equal to the true time.

Refer to FIG. 4 and its related description for specific details of the above process, which will not be repeated herein.

In this embodiment, the authenticity of the current device time can be ensured even without a network connection, thus saving time consumed for communicating with the server 4 when the application is started, and making a decision in a very short time (e.g., in 1 millisecond) to preferentially display the splash screen resource to a trusted device.

If it is determined that the current device time is unreliable, a time synchronization operation is triggered, and the correct time is forcibly re-obtained from the server 4 and updated. Later, when the device is not restarted, the above steps may be used to determine whether the current device time is reliable.

According to some embodiments, the client 2 further randomly records a timeline (including, but not limited to, the correct time, the power-on time of the device, and the system time) in a running process of an application, and when the timeline is found not conform to the normal time rule, sets the current device time to be unreliable, and then re-obtains a correct time from the server 4 for update. For example, the recorded system time is 8 o'clock, 9 o'clock, and 10 o'clock. If the next obtained system time is 6 o'clock, it indicates that the time has been changed, and the current device time is set to be unreliable.

The display module 604 is configured to, when the current device time is reliable, directly obtain the splash screen resource file through decryption and splicing, and display the splash screen resource file.

When the client 2 determines that the current device time is reliable, the splash screen resource file can be directly obtained and displayed without waiting for communication with the server 4. A specific process includes:
(1) decrypting the resource management file to obtain the hidden path and the header information;
(2) obtaining the remaining part of the hidden file according to the hidden path; and
(3) splicing the header information and the remaining part to obtain and display the complete splash screen resource file.

Refer to FIG. 5 and its related description for specific details of the above process, which will not be repeated herein.

Likewise, as there may be no limitation on the specific number of parts into which the file is split and the specific method of encryption, in other embodiments, the above process may alternatively include: decrypting the hidden path and the removed component part of the hidden file; obtaining a remaining component part of the hidden file according to the hidden path; and splicing the removed component part and the remaining component part to obtain and display the complete splash screen resource file.

The system of resource encryption and display provided by this embodiment can ensure no leakage of the splash screen resource without a large amount of encryption and decryption computing resources; ensure the authenticity of the current device time to the greatest extent without depending on a network, and make a decision on whether to display the splash screen resource to the user without waiting for reconfirmation of time from the server, thus ensuring that most normal users can view the display of the splash screen resource at the first time.

The present application further provides another implementation, that is, provides a computer-readable storage medium storing computer-readable instructions that may be executed by at least one processor to cause the at least one processor to perform the following steps:

performing file splitting and local encryption on a pre-downloaded splash screen resource file, where the local encryption is encrypting of at least one component part of the resource file; calculating a current true time according to a correct time obtained from a server and a device power-on time difference of a client, and determining whether a current device time is reliable according to the true time; if the current device time is reliable, obtaining the splash screen resource file through decryption and splicing, and displaying the splash screen resource file.

The method of resource encryption and display, the electronic apparatus, and the computer-readable storage medium provided by the embodiments of the present application can ensure the authenticity and validity of the current device time without waiting for synchronization with the server, and ensure that the splash screen resource can be displayed for most users at the first time. Moreover, without a large amount of encryption and decryption operations, the security of splash screen resources is ensured and resource leakage is prevented. Therefore, the embodiments of the present application can ensure secure and efficient display of a splash screen resource without blocking startup of an application.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element.

The serial numbers of some embodiments of the present application are merely for description, and do not represent the superiority or inferiority of the embodiments.

It will be apparent to those skilled in the art that the various modules or steps in the embodiments of the present application can be implemented by a general-purpose computing device that can be centralized on a single computing device or distributed across a network formed by a plurality of computing devices. In some embodiments, they may be implemented by program codes executable by the computing device, such that they may be stored in a storage device and executed by the computing device, and in some cases, the steps shown or described may be performed in a sequence different from the sequence described herein, or they may be respectively fabricated into individual integrated circuit modules, or a plurality of modules or steps thereof may be implemented as a single integrated circuit module. In this way, the embodiments of the present application are not limited to any specific combination of hardware and software.

The foregoing descriptions are merely illustrative of some embodiments of the present application, and are not intended to limit the scope of the embodiments of the present application. Any equivalent structure or equivalent process transformation made using the contents of the description and accompanying drawings of the embodiments of the present application, or any direct or indirect application thereof in other related technical fields shall equally fall within the protection scope of the embodiments of the present application.

What is claimed is:

1. A method, comprising:
performing file splitting and local encryption on a pre-downloaded resource file, wherein the local encryption is encrypting of at least one component part of the resource file;
calculating a current true time according to a correct time obtained from a server and a device power-on time difference of a client, and determining whether a current device time is reliable according to the true time, comprising:
determining whether the device has restarted since the correct time was last obtained from the server;
in response to determining that the device has not restarted, calculating the current true time according to the correct time last obtained from the server and the device power-on time difference, wherein the device power-on time difference is a difference between a first power-on time of the device when the correct time was last obtained from the server and a second power-on time of the device that is obtained currently;
comparing whether a current system time is equal to the true time; and
determining that the current device time is reliable in response to determining that the system time is equal to the true time; and
in response to determining that the current device time is reliable, obtaining the resource file through decryption and splicing, and displaying the resource file.

2. The method according to claim 1, wherein performing file splitting and local encryption on the pre-downloaded resource file comprises:
transferring the resource file and changing a file format to obtain a hidden file;
encrypting a hidden path corresponding to the hidden file;
splitting the hidden file into a plurality of component parts; and
removing at least one component part from the hidden file, and encrypting the removed component part.

3. The method according to claim 2, wherein obtaining the resource file through decryption and splicing, and displaying the resource file comprises:
decrypting the hidden path and the removed component part of the hidden file;
obtaining a remaining component part of the hidden file according to the hidden path; and
splicing the removed component part and the remaining component part to obtain the complete resource file, and displaying the complete resource file.

4. The method according to claim 1, wherein performing file splitting and local encryption on the pre-downloaded resource file comprises:
transferring the resource file and changing a file format to obtain a hidden file;
recording a hidden path corresponding to the hidden file into an encrypted resource management file;
splitting the hidden file into header information and a remaining part; and
removing the header information from the hidden file, and writing the header information into a corresponding field of the resource management file.

5. The method according to claim 4, wherein obtaining the resource file through decryption and splicing, and displaying the resource file comprises:
decrypting the resource management file to obtain the hidden path and the header information;

obtaining the remaining part of the hidden file according to the hidden path; and splicing the header information and the remaining part to obtain the complete resource file, and displaying the complete resource file.

6. The method according to claim 1, wherein calculating the current true time according to the correct time obtained from the server and the device power-on time difference of the client, and determining whether the current device time is reliable according to the true time further comprises:

determining that the current device time is unreliable in response to determining that the device has restarted since the correct time was last obtained from the server or in response to determining that the system time is not equal to the true time.

7. The method according to claim 1, wherein the true time is the correct time plus the device power-on time difference.

8. The method according to claim 1, wherein the method further comprises:

randomly recording system time in a running process of an application corresponding to the resource file, and in response to determining that the recorded system time is found not in an increment order, setting the current device time to be unreliable.

9. The method according to claim 1, wherein the resource is a splash screen resource.

10. An electronic apparatus, comprising:

one or more processors; and a memory storing one or more programs configured to be executed by the one or more processors, the one or more programs comprising instructions for:

performing file splitting and local encryption on a pre-downloaded resource file, wherein the local encryption is encrypting of at least one component part of the resource file;

calculating a current true time according to a correct time obtained from a server and a device power-on time difference of a client, and determining whether a current device time is reliable according to the true time, comprising:

determining whether the device has restarted since the correct time was last obtained from the server;

in response to determining that the device has not restarted, calculating the current true time according to the correct time last obtained from the server and the device power-on time difference, wherein the device power-on time difference is a difference between a first power-on time of the device when the correct time was last obtained from the server and a second power-on time of the device that is obtained currently;

comparing whether a current system time is equal to the true time; and determining that the current device time is reliable in response to determining that the system time is equal to the true time; and in response to determining that the current device time is reliable, obtaining the resource file through decryption and splicing, and displaying the resource file.

11. The electronic apparatus according to claim 10, wherein performing file splitting and local encryption on the pre-downloaded resource file comprises:

transferring the resource file and changing a file format to obtain a hidden file;

encrypting a hidden path corresponding to the hidden file;

splitting the hidden file into a plurality of component parts; and removing at least one component part from the hidden file, and encrypting the removed component part.

12. The electronic apparatus according to claim 11, wherein obtaining the resource file through decryption and splicing, and displaying the resource file comprises:

decrypting the hidden path and the removed component part of the hidden file;

obtaining a remaining component part of the hidden file according to the hidden path; and splicing the removed component part and the remaining component part to obtain the complete resource file, and displaying the complete resource file.

13. The electronic apparatus according to claim 10, wherein performing file splitting and local encryption on the pre-downloaded resource file comprises:

transferring the resource file and changing a file format to obtain a hidden file;

recording a hidden path corresponding to the hidden file into an encrypted resource management file;

splitting the hidden file into header information and a remaining part; and removing the header information from the hidden file, and writing the header information into a corresponding field of the resource management file.

14. The electronic apparatus according to claim 13, wherein obtaining the resource file through decryption and splicing, and displaying the resource file comprises:

decrypting the resource management file to obtain the hidden path and the header information;

obtaining the remaining part of the hidden file according to the hidden path; and splicing the header information and the remaining part to obtain the complete resource file, and displaying the complete resource file.

15. The electronic apparatus according to claim 10, wherein calculating the current true time according to the correct time obtained from the server and the device power-on time difference of the client, and determining whether the device current time is reliable according to the true time further comprises:

determining that the current device time is unreliable in response to determining that the device has restarted since the correct time was last obtained from the server or in response to determining that the system time is not equal to the true time.

16. The electronic apparatus according to claim 10, wherein the true time is the correct time plus the device power-on time difference.

17. The electronic apparatus according to claim 10, wherein the one or more programs further comprises instructions for:

randomly recording system time in a running process of an application corresponding to the resource file, and in response to determining that the recorded system time is found not in an increment order, setting the current device time to be unreliable.

18. A non-transitory computer-readable storage medium storing one or more programs comprising instructions that, when executed by one or more processors of a computing device, cause the computing device to perform operations comprising:

performing file splitting and local encryption on a pre-downloaded resource file, wherein the local encryption is encrypting of at least one component part of the resource file;

calculating a current true time according to a correct time obtained from a server and a device power-on time difference of a client, and determining whether a current device time is reliable according to the true time, comprising:

determining whether the device has restarted since the correct time was last obtained from the server;

in response to determining that the device has not restarted, calculating the current true time according to the correct time last obtained from the server and the device power-on time difference, wherein the device power-on time difference is a difference between a first power-on time of the device when the correct time was last obtained from the server and a second power-on time of the device that is obtained currently;

comparing whether a current system time is equal to the true time; and determining that the current device time is reliable in response to determining that the system time is equal to the true time; and in response to determining that the current device time is reliable, obtaining the resource file through decryption and splicing, and displaying the resource file.

* * * * *